United States Patent
Stoyer et al.

(10) Patent No.: US 7,356,411 B1
(45) Date of Patent: Apr. 8, 2008

(54) METHOD FOR ACQUIRING AND INTERPRETING TRANSIENT ELECTROMAGNETIC MEASUREMENTS

(75) Inventors: Charles H. Stoyer, Golden, CO (US); Kurt M. Strack, Houston, TX (US)

(73) Assignee: KJT Enterprises, Inc., Houston, TX (US)

(*) Notice: Subject to any disclaimer, the term of this patent is extended or adjusted under 35 U.S.C. 154(b) by 0 days.

(21) Appl. No.: 11/479,919

(22) Filed: Jul. 1, 2006

(51) Int. Cl.
  *G01V 3/00* (2006.01)
(52) U.S. Cl. .............................. 702/2; 702/7; 324/348; 324/350; 324/365; 181/102; 166/250.16; 703/5; 703/6; 703/9; 703/10; 703/18
(58) Field of Classification Search ............ 702/7, 702/2; 324/348–350, 365; 181/102; 166/250.16; 703/5, 6, 9, 10, 18
See application file for complete search history.

(56) References Cited

U.S. PATENT DOCUMENTS

| | | | |
|---|---|---|---|
| 5,373,443 A * | 12/1994 | Lee et al. ................. | 702/7 |
| 5,647,018 A | 11/1995 | Rueter et al. | |
| 5,563,513 A | 10/1996 | Tasci et al. | |
| 5,610,523 A * | 3/1997 | Elliot ...................... | 324/330 |
| 5,789,123 A * | 8/1998 | Cleckner et al. ........... | 430/18 |
| 6,541,975 B2 | 4/2003 | Strack | |
| 6,603,313 B1 | 8/2003 | Srnka | |
| 6,628,119 B1 | 9/2003 | Eidesmo et al. | |
| 6,670,813 B2 | 12/2003 | Strack | |
| 6,739,165 B1 | 5/2004 | Strack | |
| 6,842,006 B2 | 1/2005 | Conti et al. | |
| 6,859,038 B2 | 2/2005 | Ellingsrud et al. | |
| 7,027,922 B2 * | 4/2006 | Bespalov et al. ........... | 702/7 |
| 2005/0077902 A1 | 4/2005 | Macgregor et al. | |

OTHER PUBLICATIONS

Person et al., 'SEM Parameter Extraction Through Transient Surface Current Measurement', Mar. 1982, IEEE Publication, vol. 30, No. 2, pp. 260-266.*
Tseng et al., 'Three-Dimensional Interpretation of Electromagnetic Data Using a Modified Extended Born Approximation', 2003, USDOE Publication, pp. 1-36.*
Oldenburg et al., 'Closing the Gap Between Research and Practice in EM Data Interpretation', Oct. 2004, SEG International Publication, pp. 1-4.*

* cited by examiner

*Primary Examiner*—Elias Desta
(74) *Attorney, Agent, or Firm*—Richard A Fagin

(57) ABSTRACT

A method for interpreting transient electromagnetic survey data includes measuring transient response of a medium over a plurality of switching events. The measured transient response to a first one of the current switching events is modeled. Transient response to the model for at least one current switching event prior in time to the at least a first current switching event is calculated. The calculated transient response is summed with the first event measured response and the sum is compared to the electromagnetic survey measurements. The model is adjusted and the calculating summed transient responses is repeated until a difference between the summed calculated responses and the survey measurements falls below a selected threshold.

30 Claims, 5 Drawing Sheets

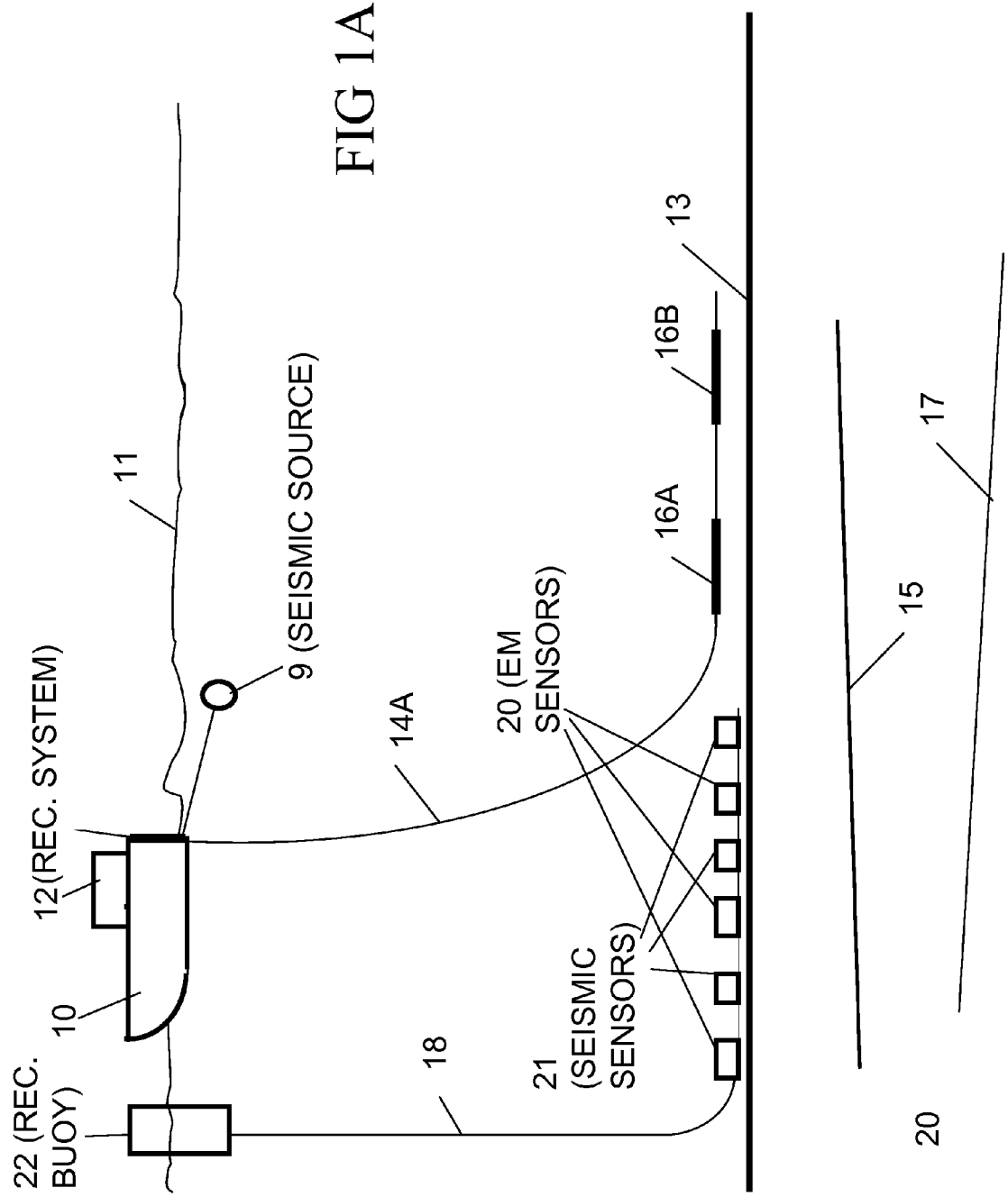

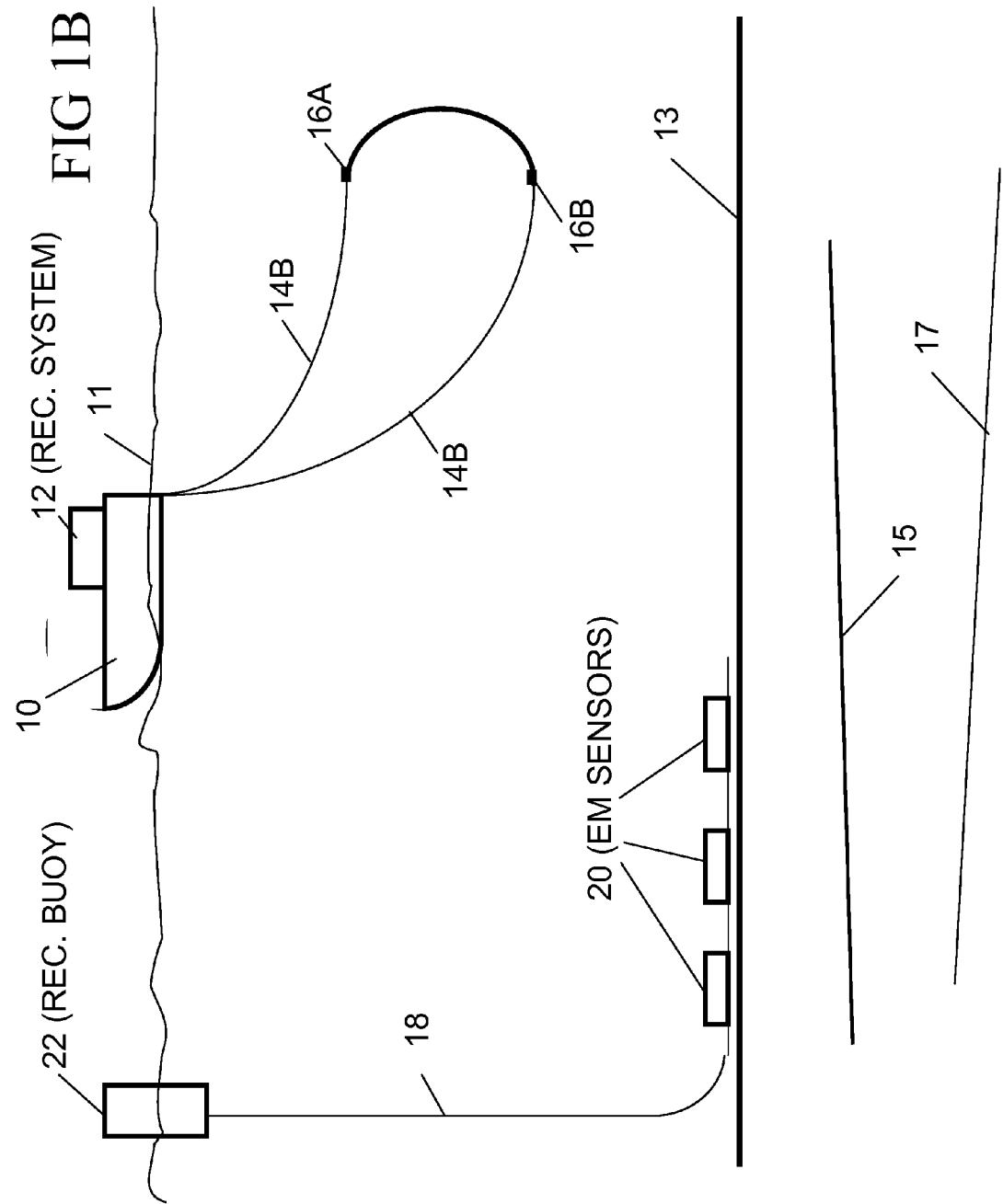

METHOD FOR ACQUIRING AND INTERPRETING TRANSIENT ELECTROMAGNETIC MEASUREMENTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of transient controlled-source electromagnetic conductivity measurement apparatus and methods subsurface Earth formations. More specifically, the invention relates to methods for acquiring and interpreting controlled-source electromagnetic measurements that account for so-called "run-on" effects. The invention can be used with but is not limited to marine electromagnetic and borehole electromagnetic surveying or geosteering.

2. Background Art

Controlled source electromagnetic surveying includes imparting an electric current or a magnetic field into subsurface Earth formations, through the sea floor in marine surveying or through the borehole fluid in borehole surveying, and measuring voltages and/or magnetic fields induced in electrodes, antennas and/or magnetometers disposed near the Earth's surface or on the sea floor. The voltages and/or magnetic fields are induced in response to the electric current and/or magnetic field imparted into the Earth's subsurface.

Controlled source surveying known in the art typically includes imparting alternating electric current into the subsurface. The alternating current has one or more selected frequencies. Such surveying is known as frequency domain controlled source electromagnetic (f-CSEM) surveying. f-CSEM surveying techniques are described, for example, in Sinha, M. C. Patel, P. D., Unsworth, M. J., Owen, T. R. E., and MacCormack, M. G. R., 1990, *An active source electromagnetic sounding system for marine use*, Marine Geophysical Research, 12, 29-68. Other publications which describe the physics of and the interpretation of electromagnetic subsurface surveying include: Edwards, R. N., Law, L. K., Wolfgram, P. A., Nobes, D. C., Bone, M. N., Trigg, D. F., and DeLaurier, J. M., 1985, *First results of the MOSES experiment: Sea sediment conductivity and thickness determination, Bute Inlet, British Columbia, by magnetometric offshore electrical sounding*: Geophysics 50, No. 1, 153-160; Edwards, R. N., 1997, *On the resource evaluation of marine gas hydrate deposits using the sea-floor transient electric dipole-dipole method*: Geophysics, 62, No. 1, 63-74; Chave, A. D., Constable, S. C. and Edwards, R. N., 1991, *Electrical exploration methods for the seafloor*: Investigation in geophysics No 3, Electromagnetic methods in applied geophysics, vol. 2, application, part B, 931-966; and Cheesman, S. J., Edwards, R. N., and Chave, A. D., 1987, *On the theory of sea-floor conductivity mapping using transient electromagnetic systems*: Geophysics, 52, No. 2, 204-217. Typical borehole related applications are described in Strack (U.S. Pat. Nos. 6,541,975 B2, 6,670,813, and 6,739,165) and Hanstein et al., (U.S. Pat. No. 6,891,376). The proposed methodology is not limited to such applications because the array is moving along the survey area.

Following are described several patent publications which describe various aspects of electromagnetic subsurface Earth surveying. For the marine case, U.S. Pat. No. 5,770,945 issued to Constable describes a magnetotelluric (MT) system for sea floor petroleum exploration. The disclosed system includes a first waterproof pressure case containing a processor, AC-coupled magnetic field post-amplifiers and electric field amplifiers, a second waterproof pressure case containing an acoustic navigation/release system, four silver-silver chloride electrodes mounted on booms and at least two magnetic induction coil sensors. These elements are mounted together on a plastic and aluminum frame along with flotation devices and an anchor for deployment to the sea floor. The acoustic navigation/release system serves to locate the measurement system by responding to acoustic "pings" generated by a ship-board unit, and receives a release command which initiates detachment from the anchor so that the buoyant package floats to the surface for recovery. The electrodes used to detect the electric field are configured as grounded dipole antennas. Booms by which the electrodes are mounted onto a frame are positioned in an X-shaped configuration to create two orthogonal dipoles. The two orthogonal dipoles are used to measure the complete vector electric field. The magnetic field sensors are multi-turn, Mu-metal core wire coils which detect magnetic fields within the frequency range typically used for land-based MT surveys. The magnetic field coils are encased in waterproof pressure cases and are connected to the logger package by high pressure waterproof cables. The logger unit includes amplifiers for amplifying the signals received from the various sensors, which signals are then provided to the processor which controls timing, logging, storing and power switching operations. Temporary and mass storage is provided within and/or peripherally to the processor.

U.S. Pat. No. 6,603,313 B1 issued to Srnka discloses a method for surface estimation of reservoir properties, in which location of and average earth resistivities above, below, and horizontally adjacent to subsurface geologic formations are first determined using geological and geophysical data in the vicinity of the subsurface geologic formation. Then dimensions and probing frequency for an electromagnetic source are determined to substantially maximize transmitted vertical and horizontal electric currents at the subsurface geologic formation, using the location and the average earth resistivities. Next, the electromagnetic source is activated at or near surface, approximately centered above the subsurface geologic formation and a plurality of components of electromagnetic response is measured with a receiver array. Geometrical and electrical parameter constraints are determined, using the geological and geophysical data. Finally, the electromagnetic response is processed using the geometrical and electrical parameter constraints to produce inverted vertical and horizontal resistivity depth images. Optionally, the inverted resistivity depth images may be combined with the geological and geophysical data to estimate the reservoir fluid and shaliness properties.

U.S. Pat. No. 6,628,110 B1 issued to Eidesmo et al. discloses a method for determining the nature of a subterranean reservoir whose approximate geometry and location are known. The disclosed method includes: applying a time varying electromagnetic field to the strata containing the reservoir; detecting the electromagnetic wave field response; and analyzing the effects on the characteristics of the detected field that have been caused by the reservoir, thereby determining the content of the reservoir, based on the analysis.

U.S. Pat. No. 6,541,975 B2 and U.S. Pat. No. 6,670,813 issued to Strack disclose a system for generating an image of an Earth formation surrounding a borehole penetrating the formation. Resistivity of the formation is measured using a DC measurement, and conductivity and resistivity of the formations is measured with a time domain signal or AC measurement. Acoustic velocity of the formation is also measured. The DC resistivity measurement, the conductivity measurement made with a time domain electromagnetic signal, the resistivity measurement made with a time domain electromagnetic signal and the acoustic velocity measurements are combined to generate the image of the Earth formation.

U.S. Pat. No. 6,739,165 issued to Strack discloses a method where transient electromagnetic measurement are performed with a receiver or transmitter being placed in a borehole and the other being placed on the surface. Either is being moved and images of fluid content changes of the reservoir are obtained.

International Patent Application Publication No. WO 0157555 A1 discloses a system for detecting a subterranean reservoir or determining the nature of a subterranean reservoir whose position and geometry is known from previous seismic surveys. An n electromagnetic field is applied by a transmitter on the seabed and is detected by antennae also on the seabed. A refracted wave component is sought in the wave field response, to determine the nature of any reservoir present.

International Patent Application Publication No. WO 03048812 A1 discloses an electromagnetic survey method for surveying an area previously identified as potentially containing a subsea hydrocarbon reservoir. The method includes obtaining first and second survey data sets with an electromagnetic source aligned end-on and broadside relative to the same or different receivers. The invention also relates to planning a survey using this method, and to analysis of survey data taken in combination allow the galvanic contribution to the signals collected at the receiver to be contrasted with the inductive effects, and the effects of signal attenuation, which are highly dependent on local properties of the rock formation, overlying water and air at the survey area. This is very important to the success of using electromagnetic surveying for identifying hydrocarbon reserves and distinguishing them from other classes of structure.

U.S. Pat. No. 6,842,006 B1 issued to Conti et al. discloses a sea-floor electromagnetic measurement device for obtaining underwater magnetotelluric (MT) measurements of earth formations. The device includes a central structure with arms pivotally attached thereto. The pivoting arms enable easy deployment and storage of the device. Electrodes and magnetometers are attached to each arm for measuring electric and magnetic fields respectively, the magnetometers being distant from the central structure such that magnetic fields present therein are not sensed. A method for undertaking sea floor measurements includes measuring electric fields at a distance from the structure and measuring magnetic fields at the same location.

U.S. Patent Application Publication No. 2004 232917 relates to a method of mapping subsurface resistivity contrasts by making multichannel transient electromagnetic (MTEM) measurements on or near the Earth's surface using at least one source, receiving means for measuring the system response and at least one receiver for measuring the resultant earth response. All signals from the or each source-receiver pair are processed to recover the corresponding electromagnetic impulse response of the earth and such impulse responses, or any transformation of such impulse responses, are displayed to create a subsurface representation of resistivity contrasts. The system and method enable subsurface fluid deposits to be located and identified and the movement of such fluids to be monitored.

U.S. Pat. No. 5,467,018 issued to Rueter et al. discloses a bedrock exploration system. The system includes transients generated as sudden changes in a transmission stream, which are transmitted into the Earth's subsurface by a transmitter. The induced electric currents thus produced are measured by several receiver units. The measured values from the receiver units are passed to a central unit. The measured values obtained from the receiver units are digitized and stored at the measurement points, and the central unit is linked with the measurement points by a telemetry link. By means of the telemetry link, data from the data stores in the receiver units can be successively passed on to the central unit.

U.S. Pat. No. 5,563,913 issued to Tasci et al. discloses a method and apparatus used in providing resistivity measurement data of a sedimentary subsurface. The data are used for developing and mapping an enhanced anomalous resistivity pattern. The enhanced subsurface resistivity pattern is associated with and an aid for finding oil and/or gas traps at various depths down to a basement of the sedimentary subsurface. The apparatus is disposed on a ground surface and includes an electric generator connected to a transmitter with a length of wire with grounded electrodes. When large amplitude, long period, square waves of current are sent from a transmission site through the transmitter and wire, secondary eddy currents are induced in the subsurface. The eddy currents induce magnetic field changes in the subsurface which can be measured at the surface of the earth with a magnetometer or induction coil. The magnetic field changes are received and recorded as time varying voltages at each sounding site. Information on resistivity variations of the subsurface formations is deduced from the amplitude and shape of the measured magnetic field signals plotted as a function of time after applying appropriate mathematical equations. The sounding sites are arranged in a plot-like manner to ensure that areal contour maps and cross sections of the resistivity variations of the subsurface formations can be prepared.

A limitation to f-CSEM techniques known in the art is that in marine surveying they are typically limited to relatively great water depth, on the order of 800-1,000 meters, or a ratio of ocean water depth to subsurface reservoir depth (reservoir depth measured from the sea floor) of greater than about 1.5 to 2.0.

A typical f-CSEM marine survey can be described as follows. A recording vessel includes cables which connect to electrodes disposed on the sea floor. An electric power source on the vessel charges the electrodes such that a selected magnitude of current flows through the sea floor and into the Earth formations below the sea floor. At a selected distance ("offset") from the source electrodes, receiver electrodes are disposed on the sea floor and are coupled to a voltage measuring circuit, which may be disposed on the vessel or a different vessel. The voltages imparted into the receiver electrodes are then analyzed to infer the structure and electrical properties of the Earth formations in the subsurface.

Another technique for electromagnetic surveying of subsurface Earth formations known in the art is transient controlled source electromagnetic surveying (t-CSEM). In t-CSEM, electric current is imparted into the Earth at the Earth's surface, in a manner similar to f-CSEM. The electric current may be direct current (DC). At a selected time, the electric current is switched off, and induced voltages and/or magnetic fields are measured, typically with respect to time over a selected time interval, at the Earth's surface. Structure of the subsurface is inferred by the time distribution of the induced voltages and/or magnetic fields. t-CSEM techniques are described, for example, in Strack, K.-M., 1992, *Exploration with deep transient electromagnetics*, Elsevier, 373 pp. (reprinted 1999).

A particular consideration in using t-CSEM surveying techniques is that the measured voltages and/or magnetic fields are as a practical matter related not only to the current switching event that the measurements directly follow, but earlier current switching events. The amplitude of the measured magnetic fields and/or the measured voltages decays as time from the switching event increases. After a sufficient amount of time has passed from a particular switching event, the amplitude of the measured magnetic field and/or voltages decays substantially to zero. The amount of time required for the amplitudes to sufficiently decay may in some instances be so long as to make it impractical to acquire measurements that do not have effect of prior switching events in the measured magnetic fields and/or voltages. What is needed is a method to acquire t-CSEM measurements that takes account of prior current switching events so as to practically minimize the time between successive switching.

SUMMARY OF THE INVENTION

One aspect of the invention is a method for interpreting transient electromagnetic survey data. A method according to this aspect of the invention includes measuring transient response of a medium over a plurality of switching events. The measured transient response to a first one of the current switching events is modeled. Transient response to the model for at least one current switching event prior in time to the at least a first current switching event is calculated. The calculated transient response is summed with the first event measured response and the sum is compared to the electromagnetic survey measurements. The model is adjusted and the calculating summed transient responses is repeated until a difference between the summed calculated responses and the survey measurements falls below a selected threshold.

Another aspect of the invention is a method for interpreting transient controlled source electromagnetic survey data. A method according to this aspect of the invention includes generating an initial model of conductivity distribution for a selected volume of the Earth's subsurface. Transient electromagnetic response of the initial model is calculated for at least a first current switching event corresponding to transient controlled source electromagnetic survey measurements made over the selected volume. Transient response to the initial model is calculated for at least one current switching event prior in time to the at least a first current switching event. The calculated transient responses are summed and, in some embodiments, a sufficient number of prior switching events are included such that the effect of switching events prior to the at least a first switching event substantially no longer contribute to the measurement. The summed transient responses are compared to the electromagnetic survey measurements. The model is adjusted, and the calculating transient responses is repeated until a difference between the summed calculated responses and the survey measurements falls below a selected threshold.

A method for acquiring transient electromagnetic survey data according to another aspect of the invention includes inducing at least one of a transient magnetic field and a transient electric field in a selected volume in the Earth's subsurface. The inducing comprises at least a first event of switching an electric current. At least one of a voltage and a magnetic field amplitude induced in response to the at least one of transient magnetic field and transient electric field is detected. An initial model of conductivity distribution for the selected volume is generated. Transient electromagnetic response of the initial model for at least the first current switching event is calculated. Transient response to the initial model for at least one current switching event prior in time to the at least a first current switching event is calculated. The calculated transient responses are summed. The summed transient responses are compared to the detected at least one of magnetic field amplitude and voltage, and the model is adjusted and the calculating transient responses is repeated until a difference between the summed calculated responses and the detected at least one of magnetic field amplitude and voltage falls below a selected threshold.

Other aspects and advantages of the invention will be apparent from the following description and the appended claims.

BRIEF DESCRIPTION OF THE DRAWINGS

FIG. 1A shows a marine transient electromagnetic survey system using a horizontal electric dipole current source and a seismic source.

FIG. 1B shows a marine transient electromagnetic survey system using a vertical electric dipole current source.

FIG. 4 is a graph of induced voltage after current switching to demonstrate the effect of run on.

DETAILED DESCRIPTION

Figure 2:
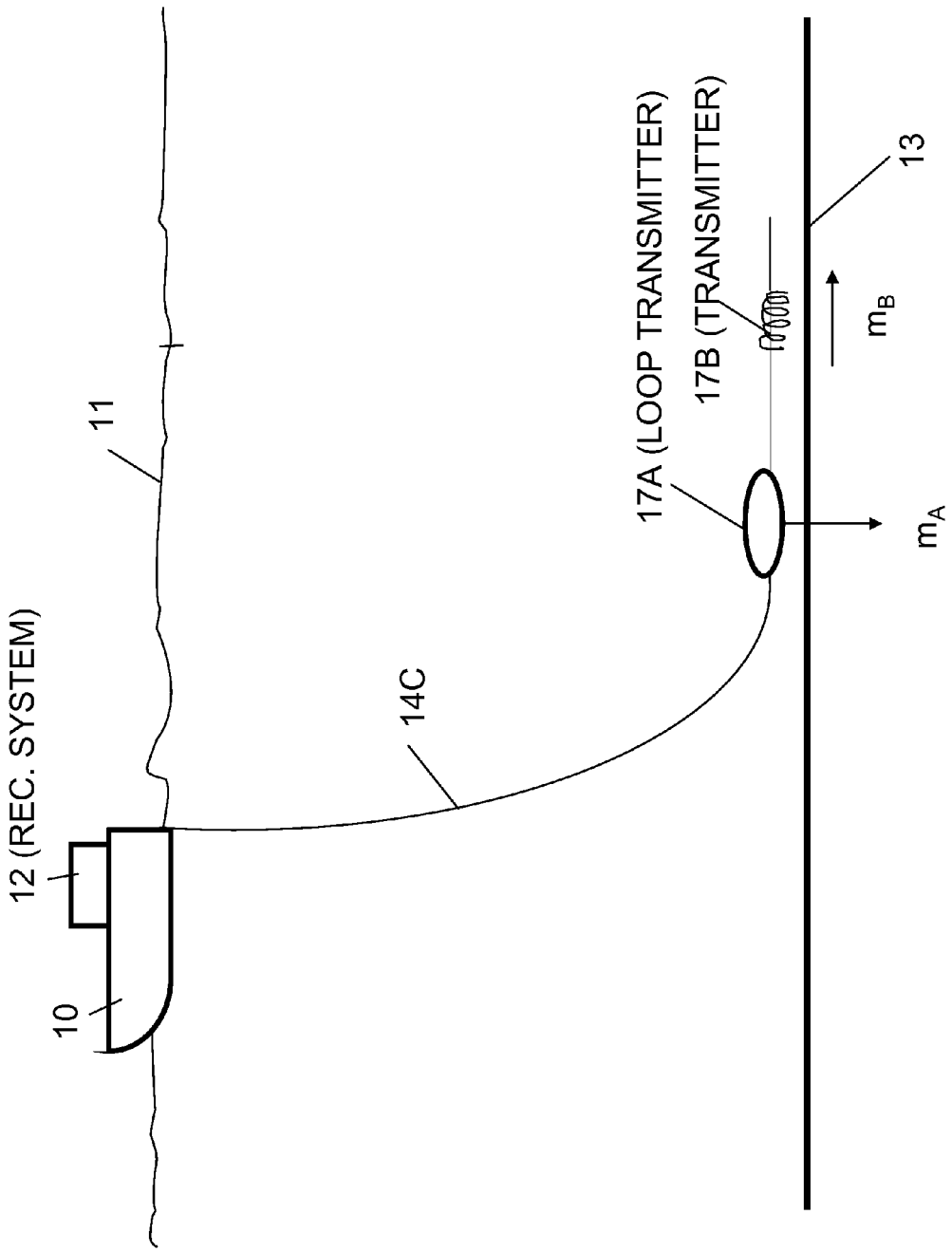
FIG. 2 shows an alternative way to energize the Earth using magnetic fields.

FIG. 1A shows one embodiment of a marine transient controlled source electromagnetic (t-CSEM) survey system for use with methods according to various aspects of the invention. The system includes a survey vessel 10 that moves in a predetermined pattern along the surface of a body of water 11 such as a lake or the ocean. The vessel 10 includes thereon source actuation, recording and navigation equipment, shown generally at 12 and referred to herein as the "recording system." The recording system 12 includes a controllable source of electric current used to energize electrodes 16A 16B towed in the water 11 near the bottom 13 thereof to impart an electric field in subsurface formations 15, 17 below the bottom 13 of the water.). The recording system 12 includes instrumentation to determine the geodetic position of the vessel 10 at any time, such as can be performed using global positioning system (GPS) receivers or the like. The recording system 12 includes equipment to transfer signals from one or more recording buoys 22. The recording buoys 22 receive and store signals from each of a plurality of t-CSEM sensors 20 positioned on the water bottom 13. The sensors may be disposed along a cable 18. The cable 18 may be of a type used in connection with seismic sensors deployed on the water bottom known in the art as "ocean bottom cables."

The sensors 20 detect various electric and/or magnetic fields that result from electric fields induced in the Earth's subsurface by current passing through the electrodes 16A, 16B. The recording buoys 22 may include telemetry devices (not shown separately) to transmit data from the received signals to the vessel 10, and/or may store the signals locally for later interrogation by the recording system 12 or by another interrogation device.

The current source (not shown separately) on the vessel 10 is coupled to the electrodes 16A, 16B by a cable 14A. The cable 14A is configured such that the electrodes 16A, 16B can be towed essentially horizontally near the water bottom 13 as shown in FIG. 1A. In the present embodiment, the electrodes can be spaced apart about 50 meters, and can be energized such that about 1000 Amperes of current flows through the electrodes 16A, 16B. This is an equivalent source moment to that generated in typical electromagnetic survey practice known in the art using a 100 meter long transmitter dipole, and using 500 Amperes current. In either case the source moment can be about $5 \times 10^4$ Ampere-meters. The electric current used to energize the transmitter electrodes 16A, 16B can be direct current (DC) switched off at a time index equal to zero. It should be understood, however, that switching DC off is only one implementation of electric current change that is operable to induce transient electromagnetic effects. In other embodiments, the current may be switched on, may be switched from one polarity to the other (bipolar switching), or may be switched in a pseudo-random binary sequence (PRBS) or any hybrid derivative of such switching sequences. See, for example, Duncan, P. M., Hwang, A., Edwards, R. N., Bailey, R. C., and Garland, G. D., 1980, The development and applications of a wide band electromagnetic sounding system using pseudo-noise source. Geophysics, 45, 1276-1296 for a description of PRBS switching.

The vessel may also tow a seismic source 9 for contemporaneous seismic and electromagnetic surveying. In such embodiments, the water bottom cable 18 may include seismic sensors 21 of any type known in the art.

In the present embodiment, as the current through the transmitter electrodes 16A, 16B is switched, a time-indexed recording of electric and/or magnetic fields detected by the various sensors 20 is recorded, either in the recording buoys 22 and/or in the recording system 12, depending on the particular configuration of recording and/or telemetry equipment in the recording buoys 22 and in the recording system 12.

FIG. 1B shows an alternative implementation of signal generation and recording, in which the transmitter electrodes 16A, 16B are arranged such that they are oriented substantially vertically along a cable 14B configured to cause the electrodes 16A, 16B to be oriented substantially vertically as shown in FIG. 1B. Energizing the electrodes 16A, 16B, detecting and recording signals is performed substantially as explained above with reference to FIG. 1A.

The embodiments of FIG. 1A and FIG. 1B use electric current applied to electrodes to impart an electric field into the Earth's subsurface. An alternative to electric fields is to use magnetic fields, and such will be explained with reference to FIG. 2. In FIG. 2, the vessel 10 tows a cable 14C which is connected to two loop transmitters 17A and 17B. The first loop transmitter 17A encloses and area perpendicular to the water bottom 13. Periodically, the recording system 12 causes electric current to flow through the first loop transmitter 17A. The current can be in any of the same forms as described with reference to FIG. 1A, including switched DC, PRBS, and alternating polarity DC. When the current changes, a transient magnetic field having dipole moment along direction $M_A$ is imparted into the Earth. At the same or at different times, current is applied to the second loop transmitter 17B. The second loop transmitter may be in the form of a solenoid coil, having a magnetic moment along direction $M_B$.

The foregoing embodiments have been explained in the context of marine electromagnetic surveying. It should be clearly understood that the foregoing embodiments are equally applicable to surveys conducted on land at the surface of the Earth or in a borehole. When conducted on land at the surface of the Earth, the sensors can be deployed in substantially similar patterns to that shown in FIG. 1A. The survey current source may be applied in the form of electric current, as shown in FIG. 1A, at the Earth's surface, or in the form of magnetic fields, as shown in and described with reference to FIG. 2. For purposes of defining the scope of the invention, the various survey devices can be said to be disposed at the top of an area of the Earth's subsurface to be surveyed. The top of the Earth's subsurface will be at the bottom of the water in a marine survey, and at the surface of the Earth in a land based survey, or on the top of a layer of floating ice where such surveys are to be conducted.

Figure 3:
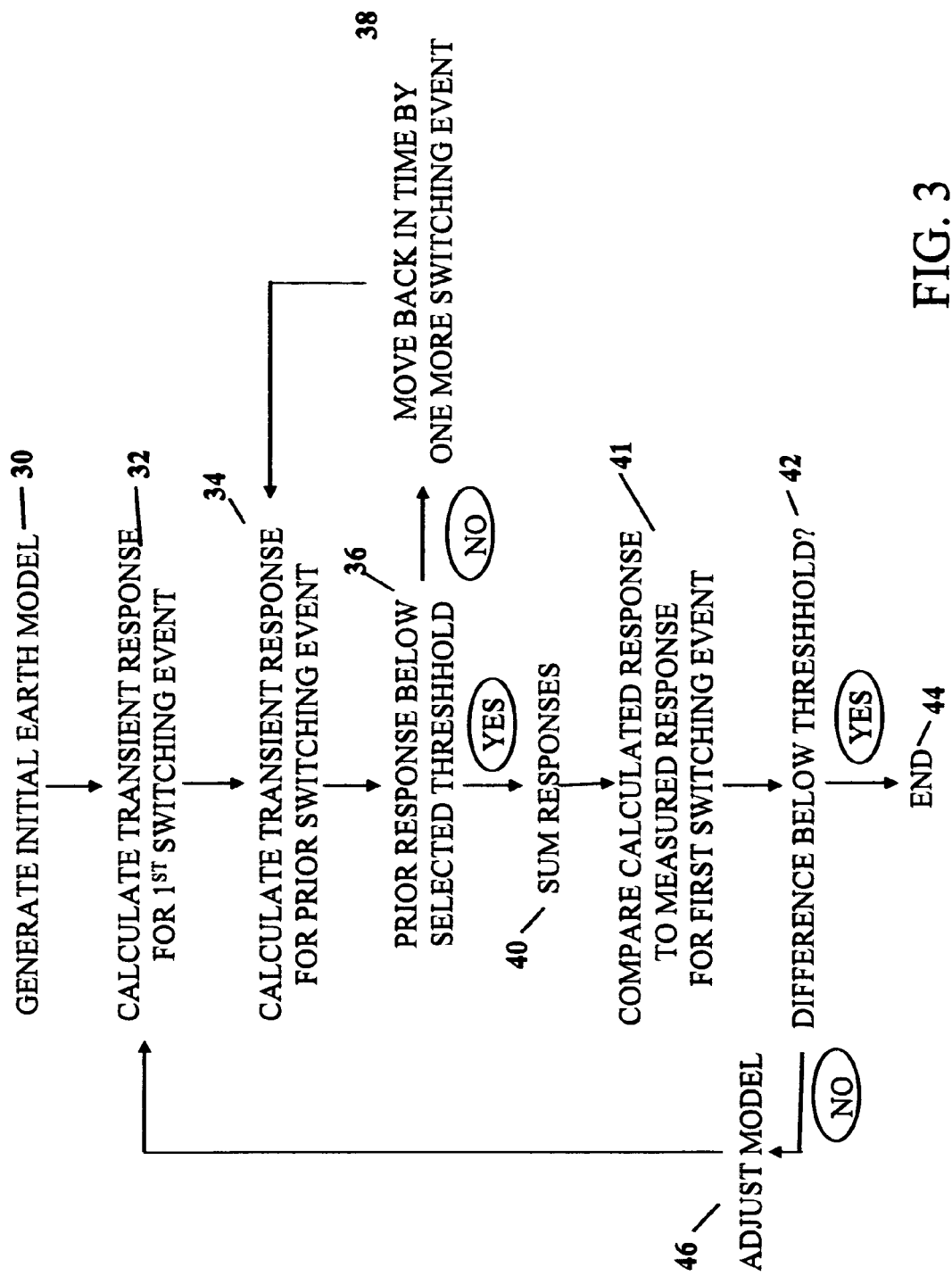
FIG. 3 is a flow chart of one embodiment of a method according to the invention.

One embodiment of an acquisition and processing method according to the invention is shown in the form of a flow chart in FIG. 3. Transient electromagentic data may be acquired substantially as explained above with reference to FIGS. 1A, 1B and 2. At 30, an initial model of the conductivity distribution in the Earth's subsurface is made for a volume of the Earth's subsurface, typically that corresponds to the acquisition geometry at the time t-CSEM measurements are made. The volume will depend on, among other factors, the positions of the various electrodes and/or loop antennas used during measurement acquisition. The initial model is used, at 32, to generate an expected transient response (whether in voltage or magnetic field amplitude) with respect to time for a first selected switching event. As previously explained, such switching event may be current switch on, current switch off or current polarity reversal. Current polarity reversal, in some embodiments, may include a short duration intervening current switch off, depending on the apparatus used to make the measurements. It will be appreciated by those skilled in the art that forward modeling programs known in the art for calculating transient response do not take account of any undecayed effects of prior current switching events.

In the present embodiment, at 34, a transient response for a switching event prior in time to the first switching event in the acquisition sequence is calculated, preferably using the same forward modeling procedure used to calculate the transient response for the first switching event, and using the same initial model of conductivity distribution. At 36, the calculated transient response of the prior switching event is evaluated with respect to a selected threshold. The selected threshold may be, for example, a predetermined fraction of the peak amplitude of the transient response of the first switching event. The selected threshold may be a predetermined peak amplitude value. If the peak amplitude of the calculated response of the prior switching event is below the threshold, at 40, the calculated responses of the prior event and the first switching event are summed. The threshold is selected such that the effect of a switching event having such transient response is believed to substantially not affect the measured response of the first switching event.

If the calculated response for the prior event is above the selected threshold, then at 38 the data are examined for a switching event back in time from the prior switching event.

A transient response for such back in time switching event is calculated at 34, just as for the prior switching event. The foregoing process is repeated for successively earlier switching events until the peak amplitude of the calculated transient response for such switching event is below the selected threshold. At such time, the calculated transient responses for all such switching events are summed, at 40. The summed response is compared, at 41, to the voltage and/or magnetic field actually measured at the first switching event. At 42, if the difference between the summed calculated responses and the measured response exceeds a selected threshold, at least one parameter of the initial model is adjusted, at 46, and the process is repeated from 32 to 42. Such adjustment of the model, and repetition of the process continues until the difference between the calculated response and the measured response is below the selected threshold, at 44, at which point the process is completed with respect to the first switching event.

The foregoing procedure may be repeated for measurements corresponding to other volumes in the Earth's subsurface until the user has determine conductivity distribution over a desired total volume of the Earth's subsurface.

Alternatively, the measurements made be analyzed without reference to a model of the Earth's subsurface. In such alternative implementation, transient response of some portion of the Earth's subsurface or other medium is measured during a plurality of switching events. The response will include decaying amplitude of measured induced voltage and/or magnetic field. The transient response after a first one of the switching events may then be modeled such as by curve fit or other mathematical representation, or by equivalent analog circuit analysis, for example. In the present embodiment, at 34, a transient response for a switching event prior in time to the first switching event in the acquisition sequence is calculated, preferably using the same modeling procedure used to calculate the transient response for the first switching event. At 36, the calculated transient response of the prior switching event is evaluated with respect to a selected threshold. The selected threshold may be, for example, a predetermined fraction of the peak amplitude of the transient response of the first switching event. The selected threshold may be a predetermined peak amplitude value. If the peak amplitude of the calculated response of the prior switching event is below the threshold, at 40, the calculated responses of the prior event and the first switching event are summed. The threshold is selected such that the effect of a switching event having such transient response is believed to substantially not affect the measured response of the first switching event.

If the calculated response for the prior switching event is above the selected threshold, then at 38 the data are examined for a switching event back in time from the prior switching event. A transient response for such back in time switching event is calculated at 34, just as for the prior switching event. The foregoing process can be repeated for successively earlier switching events until the peak amplitude of the calculated transient response for such switching event is below the selected threshold. At such time, the calculated transient responses for all such switching events are summed, at 40. The summed response is compared, at 41, to the voltage and/or magnetic field actually measured at the first switching event. At 42, if the difference between the summed calculated responses and the measured response exceeds a selected threshold, at least one parameter of the model is adjusted, at 46, and the process is repeated from 32 to 42. Such adjustment of the model, and repetition of the process continues until the difference between the calculated response and the measured response is below the selected threshold, at 44, at which point the process is completed with respect to the first switching event.

Figure 4:
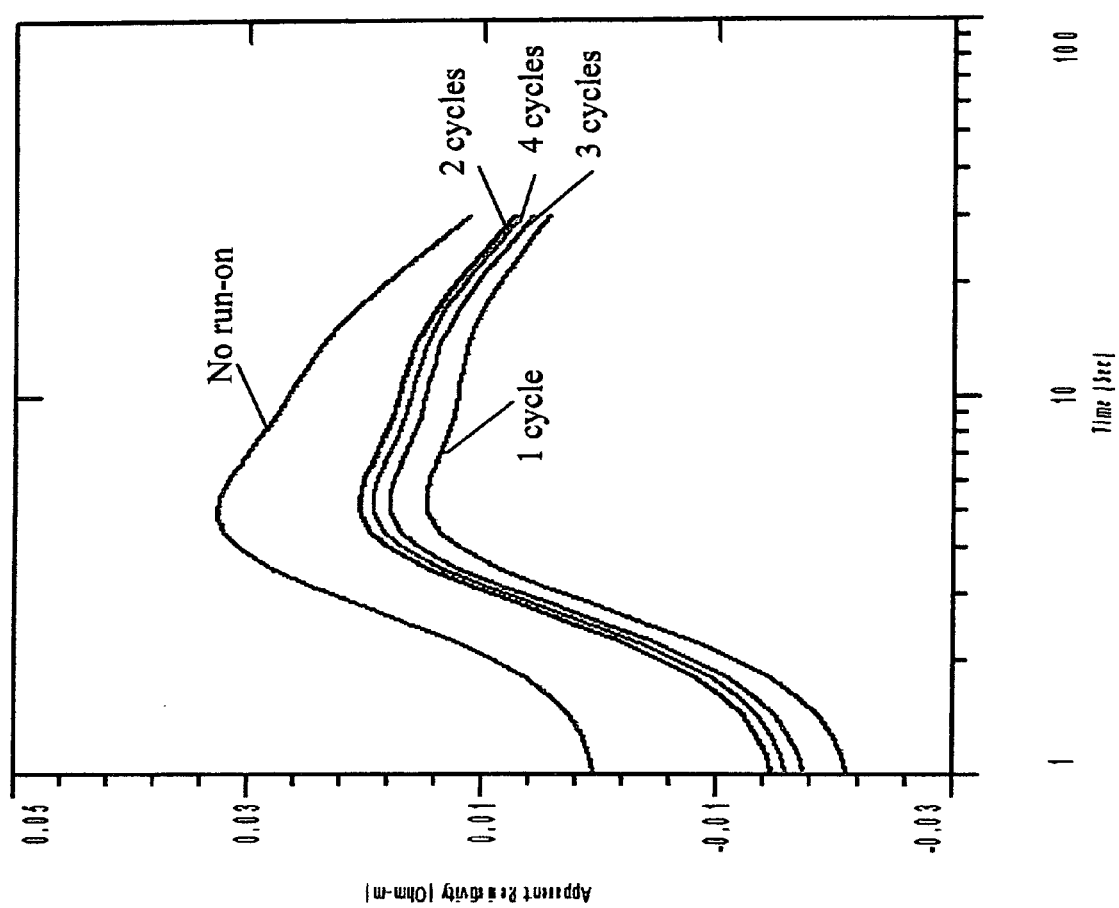

An example of the run on effect on transient response is shown in a graph in FIG. 4. The graph in FIG. 4 is a plot of apparent formation resistivity with respect to current switching event time. The current switching event used to generate the graph in FIG. 4 is a polarity reversal. The uppermost curve, labeled No Run On, represents the transient response and apparent resistivity calculated therefrom where no run on correction was used. The other curves represent transient response for one run on cycle correction through four run on cycles correction, respectively. The reason the one run on cycle correction appears to have the greatest effect is believed to be related to the type of current switching event, which as previously stated is a polarity reversal. Other types of switching events may provide different results with respect to the number of run on cycles of correction.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for interpreting transient electromagnetic survey data, comprising:
   generating an initial model of conductivity distribution for a selected volume of the Earth's subsurface;
   calculating transient electromagnetic response of the model for at least a first current switching event corresponding to transient electromagnetic survey measurements made over the selected volume;
   calculating transient response to the model for at least one current switching event prior in time to the at least a first current switching event;
   summing the calculated transient responses;
   comparing the summed transient responses to the electromagnetic survey measurements;
   adjusting the model and repeating the calculating transient responses until a difference between the summed calculated responses and the survey measurements falls below a selected threshold; and
   at least one of storing and displaying the last adjusted model.

2. The method of claim 1 further comprising:
   comparing peak amplitude of the calculated transient response of the at least one prior switching event to a selected threshold;
   if the peak amplitude exceeds a selected threshold, calculating a transient response for a switching event prior in time to the at least one prior switching event; and
   repeating the comparing peak amplitude and calculating transient response for successively prior in time switching events until the peak amplitude is below the selected threshold.

3. The method of claim 2 further comprising:
   summing the calculated transient responses for all the switching events;
   comparing the summed transient responses to the survey measurements; and
   adjusting the model and repeating the calculating all the transient responses until a difference between the summed calculated responses and the survey measurements falls below a selected threshold.

4. The method of claim 1 wherein the switching event comprises switching direct current off.

5. The method of claim 1 wherein the switching event comprises switching direct current on.

6. The method of claim 1 wherein the switching event comprises reversing direct current polarity.

7. The method of claim 1 wherein the electromagnetic survey measurements comprise voltage measurements made in response to electric current imparted into the Earth's subsurface.

8. The method of claim 1 wherein the electromagnetic survey measurements comprise voltage measurements made in response to a magnetic field imparted into the Earth's subsurface.

9. The method of claim 1 wherein the electromagnetic survey measurements comprise magnetic field amplitude measurements made in response to electric current imparted into the Earth's subsurface.

10. The method of claim 1 wherein the electromagnetic survey measurements comprise magnetic field amplitude measurements made in response to a magnetic field imparted into the Earth's subsurface.

11. A method for acquiring transient electromagnetic survey data, comprising:
  inducing at least one of a transient magnetic field and a transient electric field in a selected volume in the Earth's subsurface, the inducing comprising at least a first event of switching an electric current;
  detecting at least one of a voltage and a magnetic field amplitude induced in response to the at least one of transient magnetic field and transient electric field;
  generating an initial model of conductivity distribution for the selected volume;
  calculating transient electromagnetic response of the initial model for the at least the first current switching event;
  calculating transient response to the initial model for at least one current switching event prior in time to the at least a first current switching event;
  summing the calculated transient responses;
  comparing the summed transient responses to the detected at least one of magnetic field amplitude and voltage;
  adjusting the model and repeating the calculating transient responses until a difference between the summed calculated responses and the detected at least one of magnetic field amplitude and voltage falls below a selected threshold; and
  at least one of storing and displaying the last adjusted model.

12. The method of claim 11 further comprising:
  comparing peak amplitude of the calculated transient response of the at least one prior switching event to a selected threshold;
  if the peak amplitude exceeds a selected threshold, calculating a transient response for a switching event prior in time to the at least one prior switching event; and
  repeating the comparing peak amplitude and calculating transient response for successively prior in time switching events until the peak amplitude is below the selected threshold.

13. The method of claim 12 further comprising:
  summing the calculated transient responses for all the switching events;
  comparing the summed transient responses to the survey measurements; and
  adjusting the model and repeating the calculating all the transient responses until a difference between the summed calculated responses and the survey measurements falls below a selected threshold.

14. The method of claim 11 wherein the switching event comprises switching direct current off.

15. The method of claim 11 wherein the switching event comprises switching direct current on.

16. The method of claim 11 wherein the switching event comprises reversing direct current polarity.

17. The method of claim 11 wherein the detecting comprises measurements made in response to electric current imparted into the Earth's subsurface.

18. The method of claim 11 wherein the detecting comprises voltage measurements made in response to a magnetic field imparted into the Earth's subsurface.

19. The method of claim 11 wherein the detecting comprises magnetic field amplitude measurements made in response to electric current imparted into the Earth's subsurface.

20. The method of claim 11 wherein the detecting comprises magnetic field amplitude measurements made in response to a magnetic field imparted into the Earth's subsurface.

21. A method for interpreting transient electromagnetic survey data, comprising:
  measuring transient response of a medium over a plurality of current switching events;
  modeling the measured transient response of a first one of the current switching events;
  calculating transient response to the model for at least one current switching event prior in time to the at least a first current switching event;
  summing the modeled prior event response with the first event response;
  comparing the summed transient responses to the electromagnetic survey measurements;
  adjusting the model and repeating the calculating transient responses until a difference between the summed calculated responses and the survey measurements falls below a selected threshold and
  at least one of storing and displaying the adjusted model.

22. The method of claim 21 further comprising:
  comparing peak amplitude of the calculated transient response of the at least one prior switching event to a selected threshold;
  if the peak amplitude exceeds a selected threshold, calculating a transient response for a switching event prior in time to the at least one prior switching event; and
  repeating the comparing peak amplitude and calculating transient response for successively prior in time switching events until the peak amplitude is below the selected threshold.

23. The method of claim 22 further comprising:
  summing the calculated transient responses for all the switching events;
  comparing the summed transient responses to the survey measurements; and
  adjusting the model and repeating the calculating all the transient responses until a difference between the summed calculated responses and the survey measurements falls below a selected threshold.

24. The method of claim 21 wherein the switching event comprises switching direct current off.

25. The method of claim 21 wherein the switching event comprises switching direct current on.

26. The method of claim 21 wherein the switching event comprises reversing direct current polarity.

27. The method of claim 21 wherein the electromagnetic survey measurements comprise voltage measurements made in response to electric current imparted into the Earth's subsurface.

28. The method of claim 21 wherein the electromagnetic survey measurements comprise voltage measurements made in response to a magnetic field imparted into the Earth's subsurface.

29. The method of claim 21 wherein the electromagnetic survey measurements comprise magnetic field amplitude measurements made in response to electric current imparted into the Earth's subsurface.

30. The method of claim 21 wherein the electromagnetic survey measurements comprise magnetic field amplitude measurements made in response to a magnetic field imparted into the Earth's subsurface.

* * * * *